Nov. 28, 1944.     J. R. ALBERS     2,363,827

DUALLY PIVOTED WIND DRIVEN POWER PLANT

Filed June 29, 1942

INVENTOR
John R. Albers
BY Sam J. Slotsky
ATTORNEY

Patented Nov. 28, 1944

2,363,827

UNITED STATES PATENT OFFICE 2,363,827

DUALLY PIVOTED WIND DRIVEN POWER PLANT

John R. Albers, Sioux City, Iowa, assignor to Wincharger Corporation, Sioux City, Iowa, a corporation of Minnesota Application June 29, 1942, Serial No. 448,995

11 Claims. (Cl. 290—44)

My invention pertains to a wind driven prime mover.

An object of my invention is to provide a wind driven power plant wherein the various directional wind forces are effectively harnessed, regardless of the wind direction, whether the wind approaches the power plant from a horizontal direction or from some direction at an angle to the horizontal plane.

A further object of my invention is to provide an improved form of wind driven plant in which the unit is pivoted on a double pivot so that the impeller blades of the plant will directly face the wind regardless of wind direction.

A further object of my invention is to provide means for maintaining such a unit in normally balanced position together with suitable tail vane structures to insure that the unit faces the oncoming wind.

A further object of my invention is to provide the above mentioned objects in a simple structure.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which:

My invention contemplates a rotating wind driven prime mover in which the wind forces moving at various angles in a vertical plane are harnessed as well as those forces in a horizontal plane. For instance, the wind, besides moving in the usual side directions, north, south, east, or west, etc., also, as is well known, moves in various directions in the vertical plane, or in directions which are not substantially parallel to the terrain, in many cases such wind directions being at a considerable angle from the surface of the earth. In many cases this is due to the local shape of the terrain, such as is presented by hills, valleys, and the like, or for other reasons.

Figure 1:
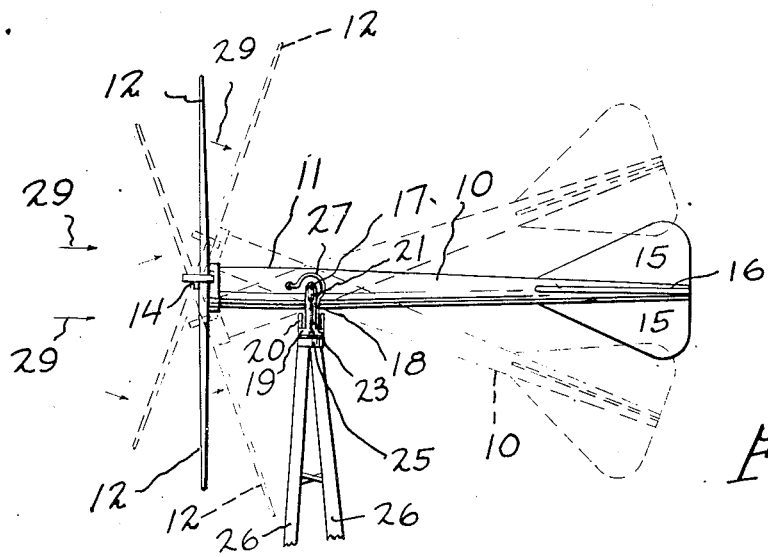
Figure 1 is a side elevation of one embodiment of my invention.

In Figure 1 a conical housing 10 encloses in its forward end a suitable electric generator 11 which is attached to impeller blades 12 to which are attached cross-arms 13 and to which in turn are attached governing plates 14 adapted to limit speed of the impeller blades. These governing plates 14 with the cross-arms 13 may be arranged for limiting, below a predetermined speed, the speed of the impeller blades, as described and claimed in my Patent 2,277,011, issued to me on March 17, 1942, and assigned to the same assignee as the present application. Attached at the rear end of the cone 10 are a pair of vertically positioned tail vanes 15, and a pair of horizontally positioned vanes 16. Attached at the balancing point of the assembled cone, vanes, impeller blades, and generator are pins or small shafts 17 which are pivotally received within vertical brackets 18 which are attached to a base plate 19 which includes limiting stop members 20.

Attached at one end of one shaft 17 is an arm 21 to which is attached at 22 a coiled spring 23 which is attached at 24 to the member 19. The member 19 is adapted to pivot about a vertical axis on suitable bearings mounted on a stationary member 25 to which is attached tower legs 26 upon which the entire unit is supported. A twin wire lead 27 passes into the generator at 28 and is looped as shown and passes downwardly along the bracket 18 where it is suitably attached to contact rings, etc., to transfer the energy below.

It will be seen from the foregoing description, that the body 10 of the unit is free to pivot either in a vertical plane at 17, or in a lateral or horizontal plane on the bearings in the member 25, the tail vanes 16 being adapted to maintain the path of travel of the impeller blades 12 directly at right angles to the wind in a vertical plane, and the vanes 15 operating in the same manner for the horizontal plane. As a result, regardless of the wind direction the unit will face the wind in its most efficient position with the impeller blades sweeping the maximum area at right angles to the wind direction.

Figure 2:
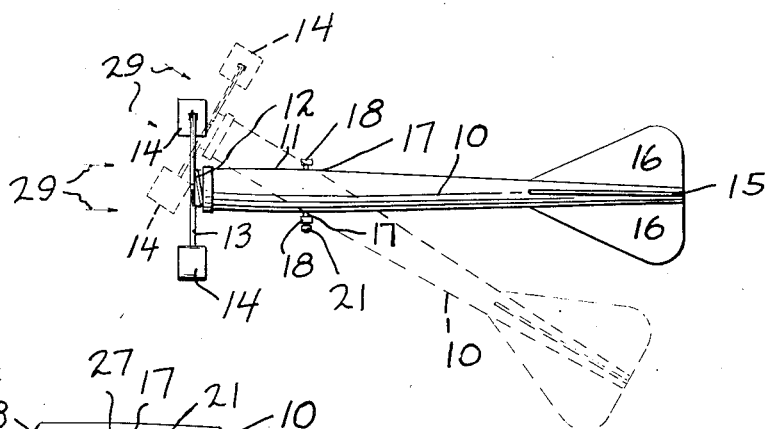
Figure 2 is a plan view of Figure 1.
Figure 3:
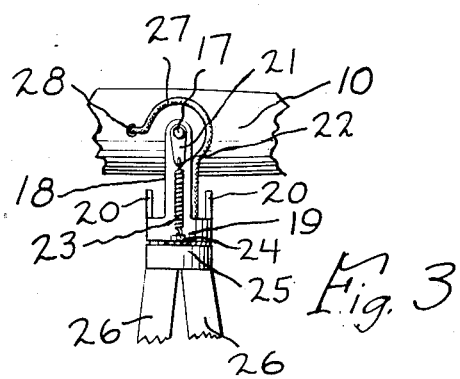
Figure 3 is a detail.

The dotted lines in Figure 1 illustrate how the unit will pivot downwardly in a vertical plane due to wind forces traveling upwardly with respect to the earth surface, or upwardly in response to wind travelling downwardly, the various wind directions being indicated by the arrows 29, and Figure 2 illustrates from the plan view of the arrangement how the unit will swing sideways or in a horizontal plane, so that as a result the wind energy will be harnessed regardless of its direction in any plane.

It is an established fact that a large percentage of the wind travels in a direction not parallel to the earth surface, and a unit which would absorb the power from the lateral winds would not absorb the maximum forces present in the non-parallel winds. In other words a substantial amount of wind power applied against the usual units which swing only laterally is lost, whereas in the present structure the additional forces are utilized. The looped lead 27 allows vertical swinging of the unit without extreme bending of the lead to preserve the wires for a long period of time. The spring 23 normally preserves balancing of the unit and also brings the unit back to normal horizontal position. It is important that the unit be brought back to a horizontal position in the absence of wind, in order that it shall have to move a minimum angle in a vertical plane when wind impinges on the propeller blade 12 at some angle other than in the horizontal plane. The stop members 20 limit vertical swinging of the unit to prevent the same from getting off balance, or tipping so far that the propeller 12 hits the tower 26.

It will be understood that instead of a generator in the housing 11, other mechanical arrangements can be employed within the housing 11, still maintaining the essential features of the invention. Note that in the described and illustrated embodiment of the invention substantially no force exists between the cone housing 10 and the tower 26 such as to twist the cone housing 10 into any predetermined position in the pressure of a wind strong enough to rotate propeller 12. Spring 23 exerts small force, sufficient only to overcome bearing friction when there is no wind. With substantially no forces acting around either the horizontal or vertical bearings between the cone housing 10 and power 26, the axis around which the propeller 12 rotates always faces in a direction substantially perpendicular to an on-coming wind, and the propeller 12 correspondingly rotates in a plane substantially perpendicular to the direction of an on-coming wind. It is only by avoiding forces acting around the bearings between the housing 10 and the tower 26 that such a relation between the propeller 12 and an on-coming wind can be maintained, with a corresponding high efficiency of the propeller 12 in abstracting power from the on-coming wind, no matter what its direction.

While I have shown and described the particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. The combination in a wind driven power plant of a housing, a wind driven impeller mounted on said housing for rotation with respect thereto when driven by wind, an electric generator mounted in said housing and arranged to be driven by said impeller, coupling means between the generator and impeller, means including a tower for supporting said housing for free movement in substantially any direction, means for orienting said housing in such a direction that said impeller sweeps through a plane substantially perpendicular to prevailing wind, said coupling means being so arranged that there is substantially no torque reaction produced by torque transmitted through said coupling means and acting on said housing to move the impeller axis out of the direction of an oncoming wind, a flexible electrical conductor connected to the generator for the transfer of power therefrom and arranged to be flexed without substantial resistance when and as said housing moves in said any direction, and means for resiliently positioning said supporting means in a predetermined position in the absence of a wind.

2. The combination in a wind driven power plant of a wind driven impeller, a power utilization device, and means for supporting said impeller and device for power transfer therebetween, coupling means between the impeller and power utilization device, means including a tower for orienting said supporting means to a position with respect to a prevailing wind such that said impeller sweeps in a plane perpendicular to said wind, said coupling means being so arranged that there is substantially no torque reaction produced by torque transmitted through said coupling means and acting on said supporting means to move the impeller axis out of the direction of an oncoming wind, a flexible conductor connected to the generator for the transfer of power therefrom and arranged to be flexed without substantial resistance when and as said orienting means causes said impeller to sweep in a plane perpendicular to said wind, and means for resiliently positioning said impeller in a predetermined position in the absence of a wind.

3. The combination in a wind driven power plant of a wind driven impeller, an electric generator, means for supporting said impeller and generator for the transfer of power therebetween, coupling means between the impeller and generator, means for orienting said supporting means with respect to a prevailing wind so that said impeller sweeps in a plane perpendicular to said wind, said orienting means including pivots and bearings between said supporting means and a fixed supporting structure, said coupling means being so arranged that there is substantially no torque reaction produced by torque transmitted through said coupling means and acting on said supporting means to move the impeller axis out of the direction of an oncoming wind, means for transferring electric energy between said generator and said structure comprising a conductor flexibly disposed around said pivot so that relative motion between said supporting means and said structure flexes said conductor, whereby said orienting means is not disturbed by such torque reaction, and means for resiliently positioning said supporting means in a predetermined direction in the absence of a wind.

4. The combination in a wind driven power plant of a wind driven impeller, a power utilization device, means for supporting said impeller and said device for the transfer of power therebetween in a prevailing wind, coupling means between the impeller and power device means including a tower for orienting said supporting means in response to such prevailing winds in a direction such that said impeller sweeps in a plane substantially perpendicular to said wind, said coupling means being so arranged that there is substantially no torque reaction produced by torque transmitted through said coupling means and acting on said supporting means to move the impeller axis out of the direction of an oncoming wind, means for resiliently orienting said supporting means in a predetermined direction in the absence of a prevailing wind, and a flexible member connected to said power device for the transfer of energy therefrom and arranged to be flexed in accordance with movement of said supporting means.

5. The combination in a wind driven power plant of a wind driven impeller, a power utilization device, coupling means between the impeller and device, means for supporting said impeller and device for the transfer of power therebetween, means for orienting said supporting means in response to a prevailing wind in such direction that said impeller sweeps in a plane substantially perpendicular to said wind, said orienting means comprising a pivot and bearing between said supporting means and a fixed supporting structure, said coupling means being so arranged that there is no torque reaction produced by said coupling means between the coupling means and supporting structure whereby said orienting means is not disturbed by such torque reaction, means for resiliently forcing said supporting means to a predetermined median position with respect to said structure in the absence of a prevailing wind, and a flexible member extending from said power device for the transfer of energy therefrom and arranged to be flexed in accordance with movement of said supporting means.

6. The combination in a wind driven power plant of a wind driven impeller, an electric generator, means including coupling means for supporting said generator and impeller in power transferring relation, means including a pivot and bearing between said supporting member and a fixed supporting structure for orienting said supporting means with respect to a prevailing wind in a direction such that said impeller sweeps in a plane substantially perpendicular to said wind, said coupling means being so arranged that there is no torque reaction produced by torque transmitted through said coupling means and acting on said supporting means to move the impeller axis out of the direction of an oncoming wind, means comprising a flexible conductor arranged around said pivot and bearing for transferring electric power from said generator to a point remote from said generator and near said fixed supporting structure, and means for resiliently positioning said supporting means in a predetermined position in the absence of a wind.

7. The combination in a wind driven power plant of a wind driven impeller, a power utilization device, means including coupling means for supporting said device and impeller in power transferring relation, means for limiting the rotational speed of said impeller to prevent destruction of said impeller by centrifugal forces, whereby the power absorbing capabilities of said impeller are limited to wind speeds below a predetermined speed, means including a supporting structure for orienting said supporting means with respect to a prevailing wind in such a direction that said impeller sweeps in a plane substantially perpendicular to said wind, said coupling means being so arranged that there is no torque reaction produced by torque transmitted through said coupling means and acting on said supporting means to move the impeller axis out of the direction of an oncoming wind, whereby maximum energy is abstracted from wind from any direction below said predetermined speed, a flexible member connected to said power device and arranged to be flexed in accordance with movement of said supporting means, and means for resiliently positioning said supporting means in a predetermined position in the absence of a wind.

8. The combination in a wind driven power plant of a wind driven impeller, a power utilization device, means including coupling means for supporting said device and impeller in power transferring relation, means for limiting the rotational speed of said impeller below a predetermined speed, said limiting means being of a type which does not change the axis of rotation of said impeller during limiting, means including a supporting structure for orienting said supporting means with respect to a prevailing wind in such a direction that the axis of rotation of said impeller is substantially parallel to said wind, said coupling means being so arranged that there is no torque reaction produced by torque transmitted through said coupling means and acting on said supporting means to move the impeller axis out of the direction of an oncoming wind, whereby said impeller abstracts maximum power from winds whose speed is below a predetermined wind speed at which the rotational speed of said impeller is limited, a flexible member connected to said power device and arranged to be flexed in accordance with movement of said supporting means, and means for resiliently positioning said supporting means in a predetermined position in the absence of a wind.

9. The combination in a wind driven power plant of a wind driven impeller, a tower, a power utilization device, means for coupling said impeller and device in power transferring relation, means for supporting said device and impeller, means including a pivot and bearing between said supporting means and said tower for orienting said supporting means with respect to a prevailing wind in a direction such that said impeller sweeps in a plane substantially perpendicular to said wind, said coupling means being so arranged that there is no torque reaction upon said supporting means produced by torque transmitted through said coupling means to move the impeller axis out of the direction of an oncoming wind, an arm having one of its ends fixed on said supporting means, a spring having one of its ends attached to the tower and its other end attached to the free end of said arm, said arm and spring being so arranged and connected as to position said supporting means in a predetermined median position in the absence of a wind, and a flexible member connected to said power device for transferring energy therefrom and arranged to flex in accordance with movement of said supporting means.

10. The combination in a wind driven power plant of a wind driven impeller and power utilization device, coupling means between the impeller and power utilization device, means for supporting said impeller and device for power transfer therebetween through said coupling means, means for mounting said supporting means for movement in the horizontal and vertical planes, means arranged to be acted on by a prevailing wind for orienting the impeller axis in the direction of prevailing winds so as to extract maximum energy from said wind, said coupling means being so arranged that there is substantially no torque reaction produced by torque transmitted through said coupling means to disturb said orienting means, whereby maximum energy is extracted from winds of all directions, a flexible member connected to said power device for the transfer of energy therefrom and arranged to flex in accordance with movement of said supporting means, and means for resiliently positioning said supporting means in a predetermined median position in the absence of a wind.

11. The combination in a wind driven power plant of a wind driven impeller, a generator, coupling means between the impeller and generator, a tower, means for supporting said impeller and generator for rotatable movement on said tower, said supporting means being arranged for movement on said tower in the horizontal and vertical planes, means arranged to be acted on by a prevailing wind for orienting the impeller axis in the direction of prevailing winds so as to extract maximum energy from said wind, said coupling means being so arranged that there is substantially no torque reaction produced by torque transmitted through said coupling means to disturb said orienting means, whereby maximum energy is extracted from winds of all directions, a conductor on said tower, means for transferring electrical energy from said generator to said conductor, said supporting means being mounted for pivoting movement between two extreme vertical positions in response to winds of varying directions, and means for maintaining said supporting means in a substantially median position in a vertical plane between said extreme positions in the absence of a wind.

JOHN R. ALBERS.